US006593845B1

(12) United States Patent
Friedman et al.

(10) Patent No.: US 6,593,845 B1
(45) Date of Patent: Jul. 15, 2003

(54) ACTIVE RF TAG WITH WAKE-UP CIRCUIT TO PROLONG BATTERY LIFE

(75) Inventors: Daniel J. Friedman, Tarrytown, NY (US); Thomas Anthony Cofino, Rye, NY (US); Trieu C. Chieu, Scarsdale, NY (US)

(73) Assignee: Intermac IP Corp., Woodland Hills, CA (US)

( * ) Notice: Subject to any disclaimer, the term of this patent is extended or adjusted under 35 U.S.C. 154(b) by 0 days.

(21) Appl. No.: 09/407,919

(22) Filed: Sep. 29, 1999

Related U.S. Application Data

(63) Continuation-in-part of application No. 09/325,475, filed on Jun. 3, 1999, now abandoned, which is a continuation of application No. 09/226,669, filed on Jan. 8, 1999, now abandoned.
(60) Provisional application No. 60/071,087, filed on Jan. 9, 1998.

(51) Int. Cl.[7] .......................... H04Q 5/22; G08B 13/14
(52) U.S. Cl. ................. 340/10.33; 340/572.1; 340/5.61; 340/10.1; 342/51
(58) Field of Search .............. 340/10.33, 572.1, 340/5.61, 10.1; 342/30, 42, 51; 455/73, 574

(56) References Cited

U.S. PATENT DOCUMENTS

| | | | | |
|---|---|---|---|---|
| 5,245,346 A | * | 9/1993 | Nishimura et al. ........... 342/42 |
| 5,448,110 A | | 9/1995 | Tuttle et al. ................. 257/723 |
| 5,525,992 A | * | 6/1996 | Froschermeier .............. 342/42 |
| 5,528,222 A | | 6/1996 | Moskowitz et al. ......... 340/572 |
| 5,621,412 A | * | 4/1997 | Sharpe et al. |
| 5,809,142 A | * | 9/1998 | Horta et al. ................. 340/928 |
| 6,070,240 A | * | 5/2000 | Xydis ......................... 713/200 |

* cited by examiner

Primary Examiner—Donnie L. Crosland
(74) Attorney, Agent, or Firm—O'Melveny & Myers LLP

(57) ABSTRACT

An active RF transponder is provided with a wake-up circuit that wakes the RF transponder from a sleep state upon detection of an RF interrogating signal. The active RF transponder includes a battery, an antenna adapted to receive RF signals from an interrogator, and electronic circuitry providing the various RF transponder functions of sending/receiving signals and storing data. A first embodiment of the invention includes a wake-up circuit that periodically checks for the presence of an RF signal at the antenna. The wake-up circuit is coupled to the antenna and includes a switch adapted to selectively couple the battery to the electronic circuitry and provide electrical power thereto upon detection of the RF signals by the antenna. The wake-up circuit further comprises an oscillator providing a clock signal having a low duty cycle that defines intervals during which the antenna is sampled for presence of the RF signals (e.g., approximately 20 ns every 100 $\mu$s). A second embodiment of the RF transponder includes a wake-up circuit as in the first embodiment that is further adapted to detect a code sequence modulated in the RF signals. The code sequence is unique for a class of RF transponder, so the wake-up circuit can discriminate between interrogating signals. A third embodiment of the RF transponder includes a wake-up circuit that wakes the RF transponder upon detection of an RF signal that contains data within a desired band of frequencies. This embodiment enables the RF transponder to discriminate between RF signals that likely contain valid data and other RF noise. After the RF transponder has been waked, the wake-up circuit returns the RF transponder to a sleep state if valid data is not detected within a predetermined period of time.

28 Claims, 9 Drawing Sheets

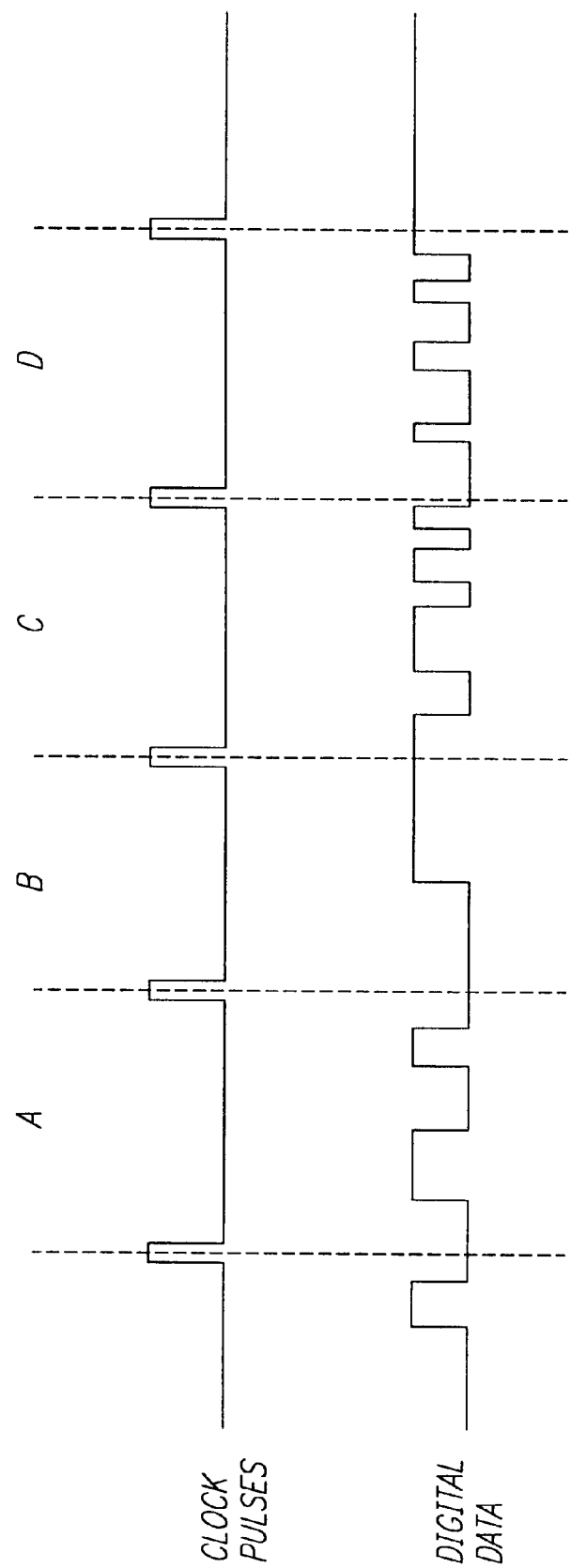

ACTIVE RF TAG WITH WAKE-UP CIRCUIT TO PROLONG BATTERY LIFE

RELATED APPLICATION DATA

This application is a continuation-in-part of application Ser. No. 09/325,475, filed Jun. 3, 1999, abandoned, which is a continuation of Ser. No. 09/226,669, filed Jan. 8, 1999 (now abandoned), which claims the benefit of U.S. Provisional Application No. 60/071,087, filed Jan. 9, 1998, which application is specifically incorporated herein, in its entirety, by reference.

BACKGROUND OF THE INVENTION

1. Field of the Invention

The present invention relates to radio frequency (RF) transponders and radio frequency identification (RFID) systems, and more particularly, to a battery-powered RF transponder having a "wake-up" circuit that turns on the RF transponder circuitry upon detection of an interrogating signal from an RFID interrogator.

2. Description of Related Art

In the automatic data identification industry, the use of RF transponders (also known as RF tags) has grown in prominence as a way to track data regarding an object on which an RF transponder is affixed. An RF transponder generally includes a semiconductor memory in which information may be stored. An RF interrogator containing a transmitter-receiver unit is used to query an RF transponder that may be at a distance from the interrogator. The RF transponder detects the interrogating signal and transmits a response signal containing encoded data back to the interrogator. RF and RFID systems are used in applications such as inventory management, security access, personnel identification, factory automation, automotive toll debiting, and vehicle identification, to name just a few.

Such RFID systems provide certain advantages over conventional optical indicia recognition systems (e.g., bar code symbols). For example, the RF transponders may have a memory capacity of several kilobytes or more, which is substantially greater than the maximum amount of data that may be contained in a conventional one-dimensional bar code symbol. The RF transponder memory may be re-written with new or additional data, which would not be possible with a printed bar code symbol. Moreover, RF transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RF transponders can be read by the interrogator at one time.

RF transponders may either be "active," in which they include an internal power source (i.e., battery), or "passive," in which they do not include a battery and derive their energy entirely from the interrogating signal provided by the RF interrogator. The active RF transponders generally have a greater transmitting range than passive transponders, but have the associated disadvantage of greater bulk due to the inclusion of the battery. The operational life of an active RF transponder is dependent upon the capacity of the battery, and it is generally desirable that an RF transponder have as long an operational life as possible (e.g., longer than five years). Even though the circuitry of the RF transponder draws relatively low current, the battery will quickly run down if the circuitry is powered up continuously. To conserve the battery power, the RF transponder may be placed in a low power (or "sleep") mode in between operations. When the RF transponder is interrogated, the RF transponder must then be "waked" or restored to an operating mode from the sleep mode.

A drawback of this type of operation is that the interrogating signal must typically be above a certain threshold level (e.g., greater than 100 mv) in order to generate sufficient current to be detected. Another drawback is that the wake-up circuit itself draws current that runs down the battery. Yet another drawback is that the wake-up circuit is not sufficiently selective, and, as a result, it tends to wake the RF transponder whenever any RF signal is detected. In certain applications, plural passive and active RF transponders may be disposed in close proximity to each other, and it would therefore be desirable to selectively wake only specific ones of the RF transponders while allowing other ones of the RF transponders to remain in the sleep mode.

Accordingly, it would be very desirable to provide a wake-up circuit for an active RF transponder that can be operated with very low current, and which can detect an interrogating signal having very low power (e.g., less than 100 mv). In addition, it would be highly desirable to provide a wake-up circuit that can selectively respond to an interrogating signal having a particular pattern so that only a particular RF transponder is waked.

SUMMARY OF THE INVENTION

In accordance with the teachings of the present invention, an active RF transponder is provided with a wake-up circuit that wakes the RF transponder from a sleep state upon detection of an RF interrogating signal. The active RF transponder includes a battery, an antenna adapted to receive RF signals from an interrogator, and electronic circuitry providing the various RF transponder functions of sending/receiving signals and storing data.

A first embodiment of the invention includes a wake-up circuit that periodically checks for the presence of an RF signal at the antenna. The wake-up circuit is coupled to the antenna and includes a switch adapted to selectively couple the battery to the electronic circuitry and provide electrical power thereto upon detection of the RF signals. The wake-up circuit further comprises an oscillator providing a clock signal having a low duty cycle that defines intervals during which the antenna is sampled for presence of the RF signals (e.g., approximately 20 ns every 100 µs). The wake-up circuit further comprises a comparator that compares the detected RF signals to a threshold value in accordance with the clock signal and signals the switch to couple the battery to the electronic circuitry upon the detected RF signals meeting the threshold value. After the switch has coupled the battery to the electronic circuitry, the switch becomes uncoupled upon either detection that the RF signals have dropped below a threshold for a predetermined period of time, or upon detection that receipt of a message encoded in the RF signals has completed.

A second embodiment of the RF transponder includes a wake-up circuit as in the first embodiment that is further adapted to detect a code sequence modulated in the RF signals. The code sequence is unique for a class of RF transponder (e.g., battery powered RF transponders), so the wake-up circuit can discriminate between interrogating signals. This embodiment permits the RF transponder to operate within the vicinity of passive RF transponders since only the intended class of RF transponders that correlate with the code sequence modulated in the RF signals will be waked.

The battery becomes uncoupled from the electronic circuitry by operation of the switch if the detected code sequence fails to correlate with a predetermined code sequence that is unique to the class of RF. transponders. The wake-up circuit oversamples the RF signals to detect the code sequence modulated therein.

A third embodiment of the RF transponder includes a wake-up circuit that wakes the RF transponder upon detection of an RF signal that contains data within a desired band of frequencies. This embodiment enables the RF transponder to discriminate between RF signals that likely contain valid data and other RF noise. The wake up circuit further comprises an oscillator providing a clock signal having a low duty cycle that defines sampling intervals during which rising or falling transitions of data signals recovered from the RF signal are counted. If the number of transitions that are detected during two successive sampling intervals falls within a desired range (i.e., corresponding to a desired frequency band), the wake-up circuit wakes the RF transponder. After the RF transponder has been waked, the wake-up circuit returns the RF transponder to a sleep state if valid data is not detected within a predetermined period of time.

A more complete understanding of the active RF transponder with a selective wake-up circuit will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 10 illustrates an exemplary digital data signal from the baseband amplifier alongside a series of clock pulses generated by the oscillator.

DETAILED DESCRIPTION OF THE PREFERRED EMBODIMENT

The present invention satisfies the need for a wake-up circuit for an active RF transponder that can be operated with very low current, and which can detect an interrogating signal while drawing very low power. In the detailed description that follows, like element numerals are used to describe like elements illustrated in one or more of the aforementioned figures.

Figure 1:
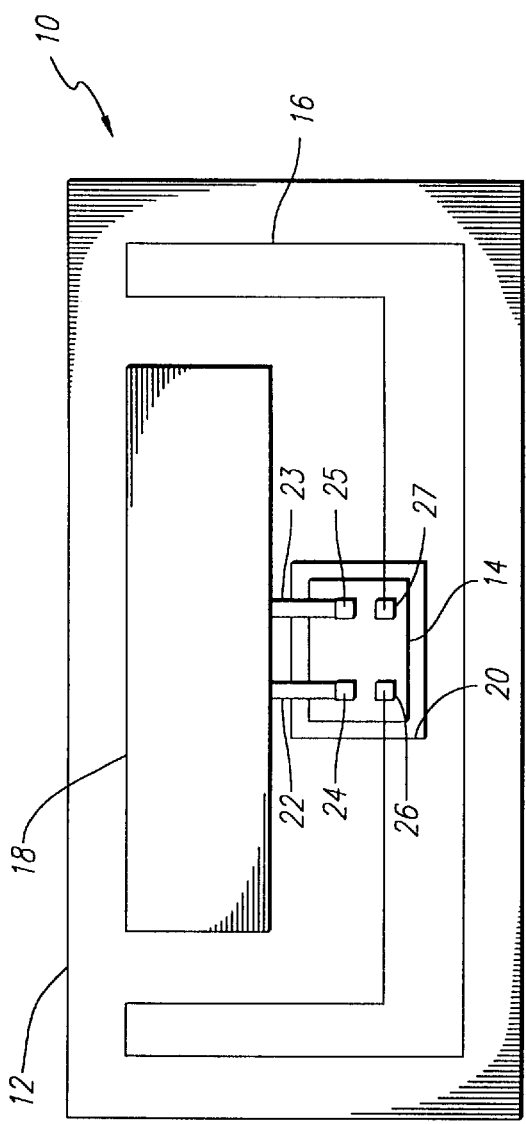
FIG. 1 is a plan view of an RF transponder having a battery.

Referring first to FIG. 1, a plan view of a thin, flexible RF transponder 10 is illustrated. The RF transponder 10 includes an integrated circuit 14 mounted on a substrate 12. As known in the art, the integrated circuit 14 includes RF receive/transmit circuits, signal processing logic, and memory. The integrated circuit 14 is connected to a folded dipole antenna 16 disposed on the substrate 12 through contacts 26, 27. A thin battery 18 is connected to the integrated circuit 14 by leads 22, 23 bonded at contacts 24, 25, respectively. The RF transponder 10 may be kept thin by placing the battery 18 adjacent to the integrated circuit 14 on the substrate 12 rather than stacking the elements. The antenna 16 is also disposed adjacent to the integrated circuit 14 without stacking. The battery 18 may have a flat form factor with a thickness of about 0.25 mm enabling it to have a flexible structure. The substrate 12 may be comprised of a flexible material, such as polyimide or polyester. The battery 18 may be attached to the substrate 12 using known techniques, such as soldering, conducting adhesive, spot welding and wire bonding. The integrated circuit 14 may also be attached to the substrate 12 using known techniques, such as thermo-compression bonding used in tape automated bonding (TAB) technology. In an embodiment of the invention, the flat form factor battery 18 has a capacity of 15–20 mA-hr.

An interrogator (not shown) initiates communication with the RF transponder 10 by emitting an RF interrogating field. In between periods of communication with the interrogator, the RF transponder must listen for the presence of an interrogating field. When the RF transponder 10 is in the periphery of the interrogating field, the RF receive circuitry produces a signal voltage level that may be too small (e.g., much less than 100 mV) to be detected. It should be appreciated that the battery would quickly become discharged if the RF receive circuitry were powered continuously by the battery 18 listening for the interrogating field, and hence, the RF transponder 10 would have a shortened "shelf-life." This is particularly problematic in RF transponders having thin form factor batteries, in view of their small capacity.

In accordance with a first embodiment of the present invention, a wake-up circuit periodically checks to determine whether an interrogating signal is present. If an interrogating signal is present, the wake-up circuit applies battery power to the remaining circuitry of the RF transponder to facilitate communications with an interrogator. If an interrogating signal is not present during the periodic check, the wake-up circuit leaves the RF transponder in the sleep mode. The wake-up circuit operates at low current even while evaluating the strength of the detected RF field. Further power reduction is achieved by operating parts of the wake-up circuit at low duty cycles. The net effect of the low current design and the low duty cycle operation is that the wake-up circuit draws very little current (e.g., approximately 200–250 nA) from the battery 18.

Figure 2:
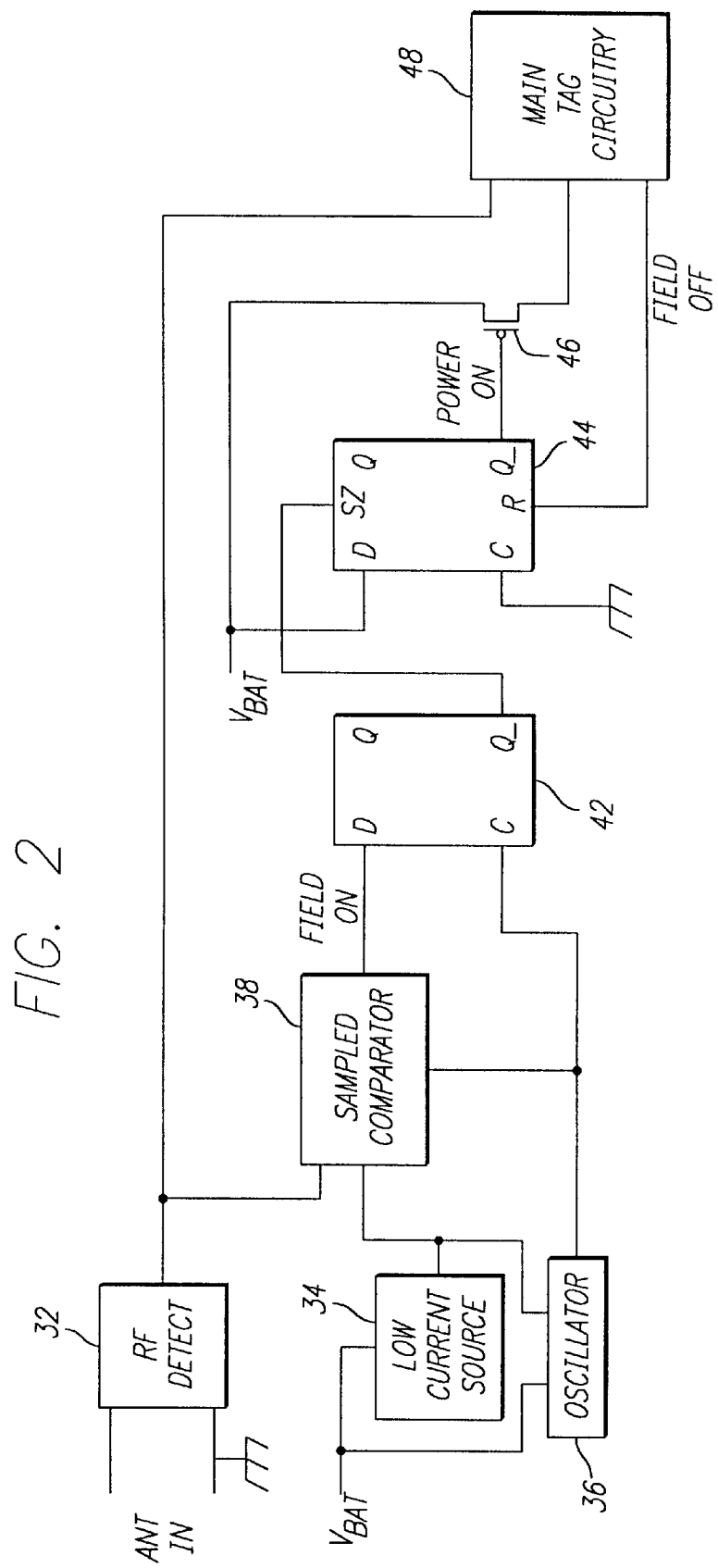
FIG. 2 is a block diagram of a first embodiment of a wake-up circuit in accordance with the present invention.

The first embodiment of the wake-up circuit for the RF transponder 10 is shown in FIG. 2. It should be appreciated that the wake-up circuit would be implemented within the integrated circuit 14 of the RF transponder 10 described above with respect to FIG. 1. The wake-up circuit includes an RF detect circuit 32, a low current source 34, an oscillator 36, a sampled comparator 38, first and second flip-flops 42, 44, and a transistor 46. The remaining circuitry of the RF transponder 10, including RF circuitry, signal processing logic and memory, is represented collectively in FIG. 2 by the main tag circuitry 48.

More specifically, the RF detect circuit 32 is coupled to the antenna 16 and generates a low voltage analog signal (e.g., less than 1 v) corresponding to the RF field present on the antenna (ANT IN). The RF detect circuit 32 detects the incoming RF signal, and clamps the low voltage analog signal to a desired range. The RF detect circuit 32 may be provided as part of an RF receiver/transmitter or may alternatively be a dedicated circuit separate from the RF receiver/transmitter. The low current source 34 provides a reference current (e.g., approximately 10 nA) to the sampled comparator 38 in response to battery voltage ($V_{BAT}$) coupled thereto. The reference current is used as a threshold value by the sampled comparator 38, and is also used to bias the oscillator 36. The oscillator 36 generates a low frequency signal including shortduration negative clock pulses (e.g., 20–25 ns width pulses every 100 $\mu$s) (shown in FIG. 4). The clock pulses are provided to the sampled comparator 38 and to the clock input of the first flip-flop 42. The leading negative edge of the clock input triggers the sampled comparator 38 to compare the low voltage analog signal from the RF detect circuit 32 to the threshold value defined by the reference current provided by the low current source 34.

The output of the comparator 38 is connected to the input terminal (D) of the first flip-flop 42. If the low voltage analog signal from the RF detect circuit 32 exceeds the threshold value, then the comparator 38 output switches to a high value. Conversely, if the low voltage analog signal from the RF detect circuit 32 is below the threshold value, the comparator 38 output switches to a low value. The high-to-low transitions (i.e., the leading negative edge) of the clock input from the oscillator 36 pulses are provided to the clock input terminal (C) of the first flip-flop 42. This causes the flip-flop to latch the inverse of the state of the signal at the input terminal (D) at the inverting output terminal (Q_). If the comparator 38 outputs a logic high, the inverting output terminal (Q_) will output a logic low with the leading negative edge of the clock input from the oscillator 36. Conversely, a logic low output from the comparator will result in logic high at the inverting output terminal (Q_).

The second flip-flop 44 has the input terminal (D) connected to the battery 18 voltage ($V_{BAT}$) (i.e., logic high) and the clock input terminal (C) connected to ground (i.e., logic low). As a result, the output of the inverting output terminal (Q_) does not change with the clock input. Instead, the second flip-flop 44 includes an inverted set input terminal (SZ) and a reset input terminal (R). The inverted set input terminal (SZ) is connected to the inverting output terminal (Q_) of the first flip-flop 42. The reset input terminal (R) is connected to the field-off signal from the main tag circuitry 48 (described below). When the signal from the inverting output terminal (Q_) of the first flip-flop 42 goes from logic high to low, the second flip-flop 44 will change state and logic low will appear at the inverting output terminal (Q_) of the second flip-flop 44. This condition will remain until the field-off signal goes from logic high to low, resetting the second flip-flop 44 and causing logic high to appear at the inverting output terminal (Q_) of the second flip-flop 44. Moreover, fluctuations of the signal from the inverting output terminal (Q_) of the first flip-flop 42, such as due to a random or short duration drop in the signal from the RF detect circuit 32, will not cause the second flip-flop 44 to change state. Alternatively, the main tag circuitry 48 can provide the field-off signal if the RF field at the antenna 16 drops below the threshold for a certain period of time, such as indicating that the interrogator has moved out of range.

The inverting output terminal (Q_) of the second flip-flop 44 is connected to the gate terminal of the transistor 46. The transistor 46 may be a conventional p-channel field effect transistor (FET) or other like component. The source terminal of the transistor 46 is connected to the battery voltage ($V_{BAT}$), and the drain terminal of the transistor is connected to the power input of the main tag circuitry 48. When the inverting output terminal (Q_) of the second flip-flop 44 goes to logic low, the transistor 46 goes into a conductive state coupling the battery voltage ($V_{BAT}$) to the power input of the main tag circuitry 48, thereby applying full battery power to the main tag circuitry. The main tag circuitry 48 is in a waked state when battery voltage ($V_{BAT}$) is applied thereto, and is in a sleep state with the battery voltage not applied. Thus, the transistor 46 directly controls the sleep or waked state of the main tag circuitry 48.

As described above, the main tag circuitry 48 includes the remaining circuitry of the RF transponder, including RF receive/transmit circuitry, signal processing logic and memory. The main tag circuitry 48 receives an analog signal from the RF detect circuit 32 corresponding to the RF field present on the antenna 16, from which the RF receive circuitry receives the interrogating signal from an interrogator (not shown). The main tag circuitry 48 then decodes the interrogating signal to recover information contained in the signal. Upon completion of receipt of a message from the interrogator, or upon a determination by the main tag circuitry 48 that the received message is not intended for the particular tag, the main tag circuitry provides the field-off signal to the second flip-flop 44, which cuts off battery voltage ($V_{BAT}$) to return the main tag circuitry 48 to the sleep state. Accordingly, the main tag circuitry 48 is restored to a waked state from a sleep state when an interrogating signal is detected by the RF detect circuit 32 that satisfies the threshold defined by the reference current provided by the low current source 34 (described above). The sampled comparator 38 operates on a low duty cycle defined by the oscillator 36, thereby reducing substantially the amount of current drawn from the battery 18 in between the periodic sampling of the signal from the RF detect circuit 32.

Figure 3:
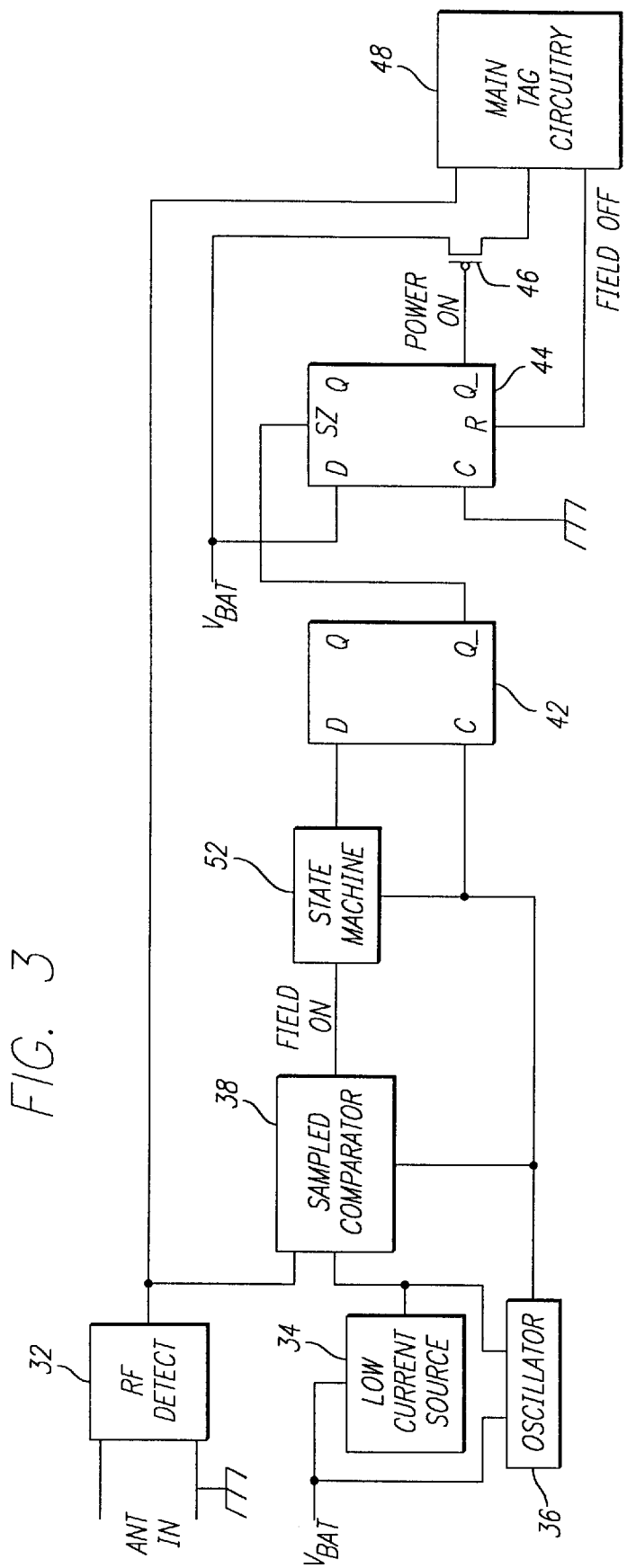
FIG. 3 is a block diagram of a second embodiment of a wake-up circuit.

FIG. 3 illustrates a second embodiment of the wake-up circuit for the RF transponder 10 that can detect an embedded code in the interrogating signal in order to discriminate between interrogating signals. This way, the wake-up circuit can recognize that an interrogating signal is intended for a particular class of RF transponder, e.g., active RF transponders. If, for example, an interrogating signal is intended for a different class of RF transponder, the wake-up circuit will leave the main tag circuitry in the sleep mode. This feature enables active RF transponders to be present alongside passive RF transponders. Since passive RF transponders do not include a power source, there is no penalty in waking the passive RF transponders every time any interrogating signal is present. In contrast, active RF transponders draw current from the battery every time they are waked by an interrogating signal. It is therefore advantageous for active RF transponders to only be waked when an interrogating signal is actually intended for that particular class of RF transponder.

The wake-up circuit of FIG. 3 is similar to the wake-up circuit of FIG. 2, except that it further includes a state machine 52. As will be described below, the interrogating signal provided by an interrogator is modulated with a very slow code sequence (i.e., slower than the clock rate of the pulses provided by the oscillator 36) that is recovered by the state machine 50. When an RF field is present on the antenna 18 that satisfies the threshold value consistent with a true interrogating signal, the state machine 52 determines whether the code sequence is modulated on the interrogating signal. If the modulated code sequence matches a predetermined code sequence for that particular class of RF transponder, the state machine 52 will provide a high value signal to the input terminal (D) of the flip-flop 42 to wake the RF transponder. Upon completion of receipt of a message from the interrogator, or upon loss of signal or detection that the received message is intended for another RF transponder, the main tag circuitry 38 provides the field off signal to return the main tag circuitry to the sleep state (as described above).

Figure 4:
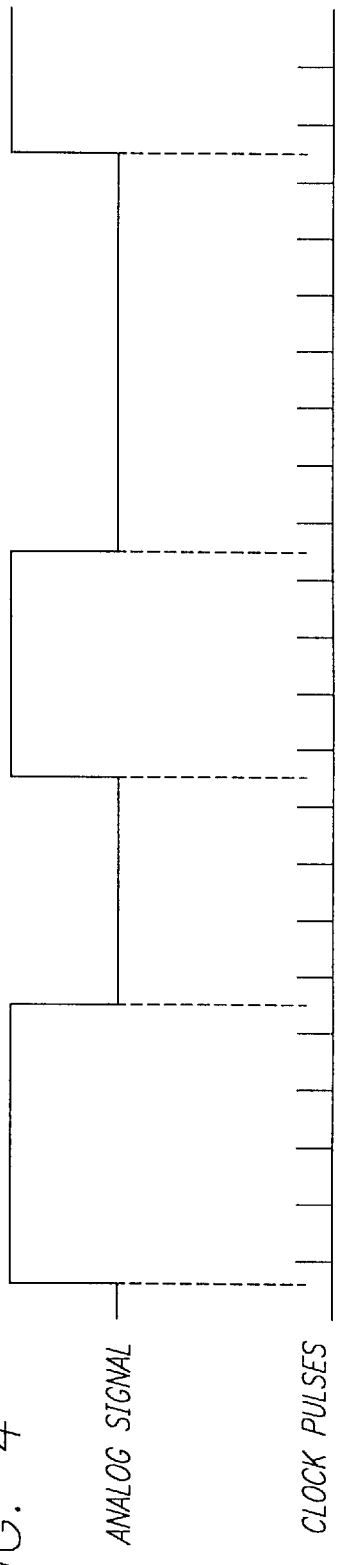
FIG. 4 illustrates an exemplary interrogating RF field alongside a series of sampling clock pulses generated by the wake-up circuits of FIGS. 2 and 3.

FIG. 4 illustrates an exemplary analog signal provided by the sampled comparator 38 to the state machine 52 alongside a series of clock pulses generated by the oscillator 36. The clock pulses are used to sample the analog signal at a rate higher than the data rate of the signal, i.e., over-sampling. In the example shown, the analog signal is high for five successive counts of the clock, then low for four counts, then high for four counts, then low for seven counts, etc. If a single time period is defined as two, three, four, or five counts, and two successive time periods is defined as six, seven, eight or nine counts, then the seven count portion of the exemplary signal can be construed as being two successive time periods. The state machine 52 therefore decodes the exemplary data signal as 10100. If the analog signal is high or low for only one count, or high or low for more than ten counts, then the analog signal may be construed as being in error. The state machine 52 then compares the decoded data signal to a predetermined code sequence stored in memory within the state machine. If the decoded data signal fails to correlate with the predetermined code sequence, then the output of the state machine 52 remains at a low value signal. As described above, the low value signal applied to the input terminal (D) of the first flip-flop 42 causes the main tag circuitry 48 to remain in the sleep mode. Conversely, if the decoded data signal correlates with the predetermined code sequence, then the state machine 52 provides a high value signal to the input terminal (D) of the first flip-flop 42, causing the flip-flop to change state and provide power to the main tag circuitry 48 (i.e., waked state).

It should be appreciated that each class of RF transponder would have a unique code sequence known to the interrogator. A long code sequence would enable the interrogator to communicate with a large number of classes of RF transponders, but would also require the state machine 52 to perform a more complex correlation. Conversely, a short code sequence can be decoded and correlated more quickly, but would not support as many classes of RF transponders. The code length may therefore be selected on the basis of the operational needs of a particular application. It should also be appreciated that the functions provided by the flip-flops 42, 44 may be incorporated into the state machine 52. Alternatively, the main tag circuitry 48 could be utilized to decode and correlate the code sequence, but that would necessarily require the main tag circuitry to be waked and consequently draw current during the operation.

As known in the art, the main tag circuitry 48 will generally include a separate oscillator used for tag communication, including the sampling of received RF signals in order to recover data therefrom. This oscillator is separate from the oscillator 36 of the wake-up circuit described above, and generally operates at a much higher frequency than the oscillator 36 and draws more current from the battery than the oscillator 36. For this reason, it is advantageous to include the separate oscillator 36 as part of the wake-up circuit even though there is redundant circuitry in the RF transponder as a result. It would be anticipated within the scope of the present invention to provide a single oscillator that performs both functions, by operating at a low frequency in providing the sampling function of the wake-up circuit and operating at a higher frequency in the normal data processing function. The stability of an oscillator generally varies with respect to the supply voltage, temperature, etc., and it is known to synchronize the frequency of the RF transponder oscillator with decoded data from the interrogator. After the RF transponder is waked, the oscillator could then provide a more stable frequency for tag communication. Alternatively, an oscillator could be used that operates at a single frequency drawing low current while accepting somewhat reduced performance than would ordinarily be needed for fast and reliable communication with the interrogator.

Figure 5:
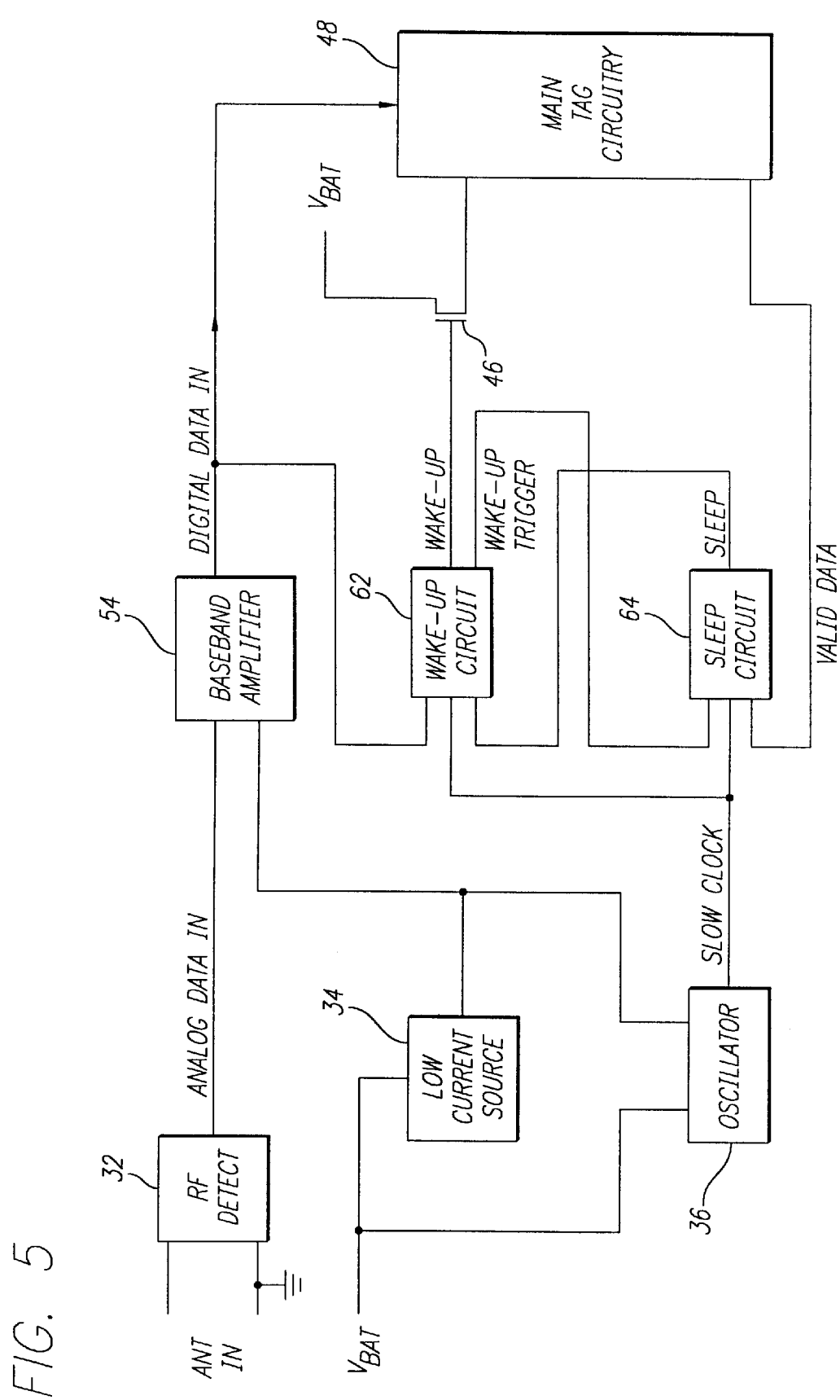
FIG. 5 is a block diagram of a third embodiment of a wake-up circuit.

FIG. 5 illustrates a third embodiment of a wake-up circuit for the RF transponder 10 that discriminates between interrogating signals and random RF noise. Many electronic devices, such as cellular telephones, radar, etc., emit random RF signals or noise that may occasionally fall within the operating frequency range of the RF transponder. It is possible that these RF noise signals could mistakenly trigger the wake-up circuit of FIG. 2 (described above). Even though the main tag circuitry would quickly recognize that the RF signals do not contain valid data and return the RF transponder to sleep mode, repeated false wake-ups nevertheless tend to run down the battery. The second embodiment of the wake-up circuit of FIG. 3 adequately discriminates between true interrogating signals and random RF emissions, but a drawback of using a predetermined code sequence is that the interrogator must be configured to transmit the code sequence. Existing interrogators already in use in the field may not be capable of being programmed to transmit a unique code sequence for certain classes of RF transponder, and thus would be unable to communicate with the RF transponders equipped with such wake-up circuits. Accordingly, the third embodiment of a wake-up circuit of FIG. 5 is adapted to discriminate between an interrogating signal containing actual data and other RF sources, without requiring modulation of a unique code sequence onto the interrogating field.

The wake-up circuit of FIG. 5 is similar to the foregoing embodiments, and further includes a baseband amplifier 54, a wake-up control circuit 62, and a sleep control circuit 64. As known in the art, the interrogating signal contains data signals modulated using a predetermined encoding scheme, such as on-off keying (OOK). These data signals are provided at a data rate that is generally higher than the relatively low clock rate of the oscillator 36 (described above). The baseband amplifier 54 recovers digital data from the analog data signals provided by the RF detect circuit 32. Unlike the preceding embodiments, the baseband amplifier 54 is powered continuously; however, the baseband amplifier 54 draws such little current (as will be further described below) that the battery life is not adversely affected.

The oscillator 36 provides the slow clock signal to each of the wake-up control circuit 62 and the sleep control circuit 64. The wake-up control circuit 62 receives the recovered digital data from the baseband amplifier 54, and counts the number of high-to-low and low-to-high edge transitions of the digital data that occur during a single period of the clock signal provided by the oscillator 36. If the number of edge transitions counted during two successive periods of the clock signal fall within a predetermined range (e.g., between three and fifteen), then the wake-up control circuit 62 generates a wake-up signal. The wake-up signal drives the transistor 46 into a conductive state coupling the battery voltage ($V_{BAT}$) to the power input of the main tag circuitry 48 to restore the RF transponder to a waked state. The wake-up control circuit 62 also provides a wake-up trigger signal to the sleep control circuit 64.

Referring briefly to FIG. 10, an exemplary digital data signal from the baseband amplifier 45 is shown alongside a series of clock pulses generated by the oscillator 36. The clock pulses each define the start of a counting period, labeled as a, b, c, d, etc. As shown in FIG. 10, there are four edge transitions in counting period a, one edge transition in counting period b, seven edge transitions in counting period c, and seven edge transitions in counting period d. The counting periods c, d represent two successive periods of the clock signal during which the number of edge transitions fall within the predetermined range, and the wake-up control circuit 62 will thereby issue the wake-up signal at the end of counting period d. While the number of edge transitions counted during counting period a satisfied the range criteria, the subsequent counting period b did not satisfy the criteria for two successive counting periods. It should be appreciated that the wake-up control circuit 62 operates like a rough frequency detector. For example, the presence of a signal having three to fifteen edge transitions during a period of 50–200 µs corresponds to a modulated signal in a 15–300 KHz band. It should also be appreciated that the range of edge transitions that are detected can be varied in accordance with the expected data rate of an interrogating signal, and that the foregoing ranges are merely exemplary.

Returning to FIG. 5, after the RF transponder has been waked, the main tag circuitry 48 begins to decode the recovered data received from the baseband amplifier 54. If the decoded data is valid, the main tag circuitry 48 provides a valid data signal to the sleep control circuit 64. In the absence of the valid data signal or the wake-up signal, the sleep control circuit 64 counts pulses of the clock signal from the oscillator 36. After a predetermined number of clock pulses are counted (e.g., 1,024), the sleep control circuit 64 provides a sleep signal to the wake-up circuit. This causes the wake-up signal to be disabled, turning off the transistor 46 and uncoupling the battery voltage ($V_{BAT}$) from the power input of the main tag circuitry 48 to return the RF transponder to a sleep state. If either the valid data signal or the wake-up signal is received by the sleep control circuit 64, the count of clock pulses is reset to zero and the count begins anew. For a clock period of 200 µs, the exemplary count of 1,024 corresponds roughly to a delay period of 200 ms.

Figure 6:
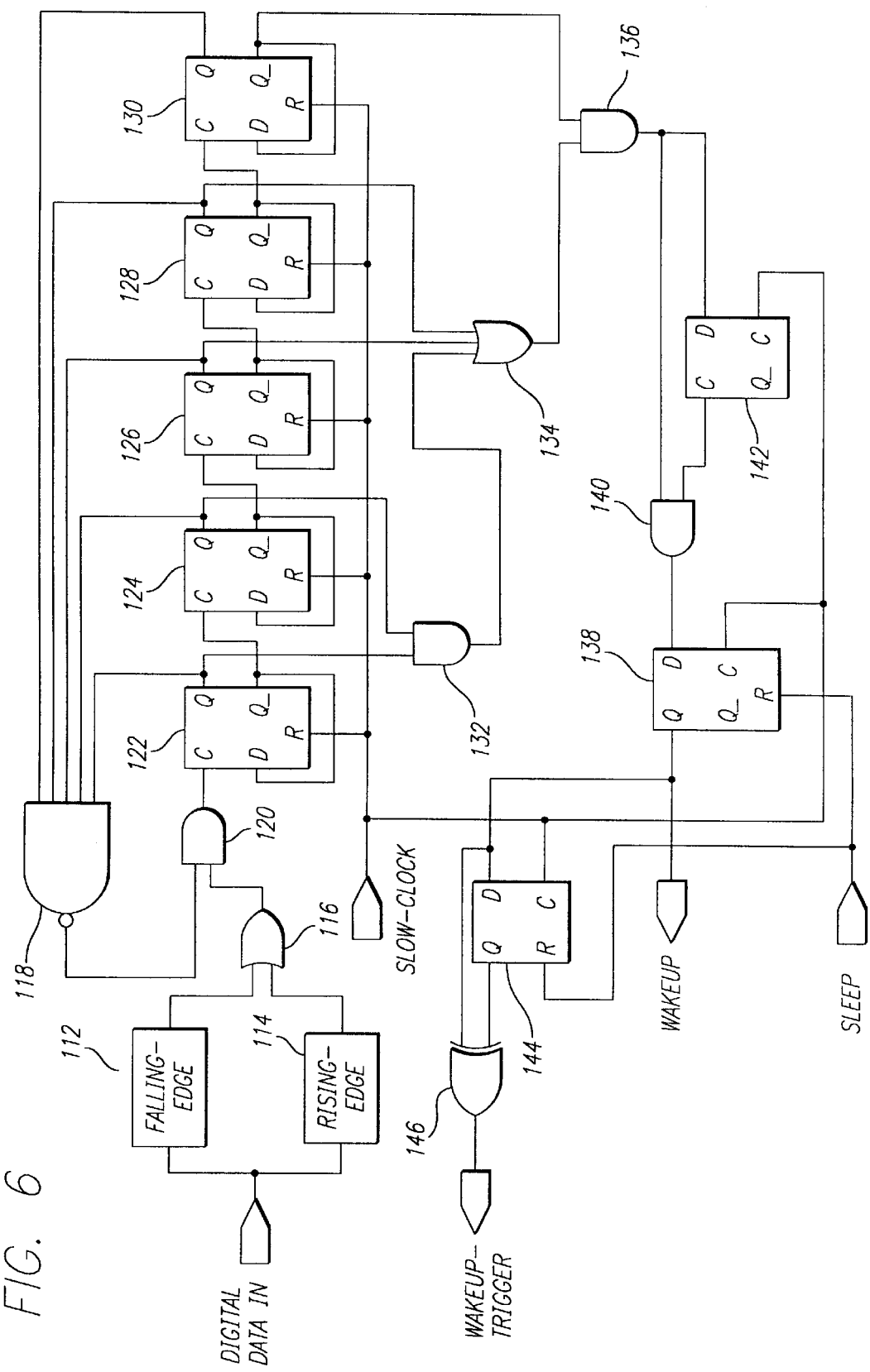
FIG. 6 is a schematic drawing of an exemplary wake-up control circuit of the third embodiment of a wake-up circuit of FIG. 5.

FIG. 6 illustrates a schematic drawing of an exemplary wake-up control circuit 62 used in the wake-up circuit of FIG. 5. A first portion of the circuit detects the presence of low-to-high (i.e., rising) or high-to-low (i.e., falling) edges of the digital data received from the baseband amplifier 54 (see FIG. 5). As noted above, the wake-up control circuit 62 makes a count of both rising and falling edges. The digital data is provided to a falling edge detector 112 and a rising edge detector 114 connected in parallel. The falling edge detector 112 generates a logic high pulse when a falling edge is detected, and the rising edge detector 114 generates a logic high pulse when a rising edge is detected. The outputs of the rising and falling edge detectors 112, 114 are provided to an OR gate 116, which generates a logic high pulse when either one of the rising or falling edge detectors generates a logic high pulse. Accordingly, the OR gate 116 generates a logic high pulse whenever a rising or falling edge is detected.

The logic high pulses generated within a period of the slow clock signal from the oscillator 36 (see FIG. 5) are counted by a counter portion of the wake-up control circuit including AND gate 120, NAND gate 118 and flip-flops 122, 124, 126, 128 and 130. The flip-flops 122, 124, 126, 128, 130 are connected in a manner to form a counter, with the output terminal (Q) of the first flip-flop 122 providing the least significant bit (LSB) of the counter and the output terminal (Q) of the fifth flip-flop 130 providing the most significant bit (MSB). Specifically, the input terminal (D) and inverting output terminal (Q_) of each one of the flip-flops 122, 124, 126, 128, 130 are connected together. The clock input terminal (C) of the first flip-flop 122 is connected to the output of the AND gate 120, and the clock input terminals (C) of the successive flip-flops 124, 126, 128, 130 are connected to the inverting output terminals (Q_) of the preceding flip-flops 122, 124, 126, 128, respectively. The output terminals (Q) of each of the flip-flops 122, 124, 126, 128, 130 are connected to inputs of the NAND gate 118. The AND gate 120 receives as inputs the output of the OR gate 116 and the output of the NAND gate 118.

The reset input terminal (R) of each of the flip-flops 122, 124, 126, 128, 130 are each connected to the slow clock signal from the oscillator 36.

A counting period begins with a clock pulse of the slow clock signal, which resets each of the flip-flops 122, 124, 126, 128, 130, thereby setting the respective output terminals (Q) all to logic low, corresponding to a binary count of 00000 for the counter.

The NAND gate 118 provides a logic high output for all states of the counter except when the counter has reached a maximum value, i.e., logic high signals at each of the output terminals (Q) of the flip-flops 122, 124, 126, 128, 130. Therefore, each logic high pulse from the OR gate 116 corresponding to a rising or falling edge passes through the AND gate 120 to the clock input terminal (C) of the first flip-flop 122. The first logic high pulse following the start of a counting period causes the first flip-flop 122 to change state, with its output terminal (Q) going to logic high and inverting output terminal (Q_) going to logic low, corresponding to a binary count of 00001 for the counter. The next logic high pulse causes both the first and second flip-flops 122, 124 to change state, with the output terminal (Q) of flip-flop 124 going to logic high and the output terminal (Q) of flip-flop 122 going to logic low, corresponding to a logic count of 00010 for the counter. The counter will continue to count logic high pulses in a like manner until the output terminals of all flip-flops 122, 124, 126, 128, 130 are at logic high, corresponding to a binary count of 11111 for the counter, whereupon the NAND gate 118 goes to logic low, precluding additional logic high pulses to pass through the AND gate 120. Also, a clock pulse from the slow clock terminates the counting period by resetting each of the flip-flops 122, 124, 126, 128, 130.

After the count of logic high pulses is determined by the counter portion of the wake-up control circuit, a separate portion of the wake-up control circuit determines whether the count is within the desired range to wake up the RF transponder. This portion of the wake-up control circuit includes an AND gate 132, an OR gate 134, and an AND gate 136. The input terminals of the AND gate 132 are connected to the output terminals (Q) of the first two flip-flops 122, 124. The input terminals of the OR gate 134 are connected to the output terminals (Q) of the third and fourth flip-flops 126, 128 and the output of the AND gate 132. The input terminals of the AND gate 136 are connected to the output of the OR gate 134 and to the inverting output terminal (Q_) of the fifth flip-flop 130. The output of the AND gate 132 goes to logic high when the output terminals (Q) of the first two flip-flops 122, 124 are at logic high (corresponding to a count of 00011, or three). As described above, a count of three edge transitions is the minimum threshold level for a single counting period for waking the RF transponder. The output of the OR gate 134 goes to logic high when the output of the AND gate 132 goes to logic high, or when the output terminal of the third flip-flop 126 is at logic high (corresponding to a binary count of 001XX, or at least four), or when the output terminal of the fourth flip-flop 126 is at logic high (corresponding to a binary count of 01XXX, or at least eight). As long as the count remains below 10000, or sixteen, the inverting output terminal (Q_) of the fifth flip-flop 130 will be at logic high, thereby permitting the output of the OR gate 134 to pass through the AND gate 136. Once the count reaches 10000, or sixteen, the inverting output terminal (Q_) of the fifth flip-flop 130 goes to logic low, and the output of the AND gate 136 goes to logic low as well. Accordingly, the output of the AND gate 136 goes to logic high when the count is between 00011 (i.e., three) and 01111 (i.e., fifteen). As noted above, it should be appreciated that different count ranges can be advantageously utilized depending upon the operational requirements of an RFID system, and the accompanying logic of the wake-up control circuit would thereby be modified accordingly.

A tracking portion of the wake-up control circuit determines whether two successive clock periods have counts of data edges within the desired threshold, and includes flip-flops 138, 142, and an AND gate 140. The clock input terminals (C) of the flip-flops 138, 142 are each connected to the slow clock from the oscillator 36 (see FIG. 5). The AND gate 140 receives inputs from the output terminal (Q) of the flip-flop 142 and the output of the AND gate 136. During a first clock period in which the count satisfies the threshold and the output of the AND gate 136 goes to logic high, the output terminal (Q) of the flip-flop 142 remains at logic low, and as a result the output of the AND gate 140 remains at logic low. The next clock pulse of the slow clock causes the flip-flop 142 to change state and the output terminal (Q) therefore goes to logic high. If, during a second clock period, the count also satisfies the threshold and the output of the AND gate 136 again goes to logic high, the AND gate 140 will also go to logic high. The next clock pulse of the slow clock will thereby cause the output terminal (Q) of the flip-flop 138 to go to logic high and provide the wake-up signal. Conversely, if the count fails to satisfy the threshold and the output of the AND gate 136 remains at logic low during a second clock period, the AND gate 140 will remain at logic low and the next clock pulse of the slow clock will cause the output terminal (Q) of the flip-flop 142 to go back to logic low. Therefore, two successive clock periods in which the data edge count satisfies the threshold causes the wake-up signal to be issued.

When the wake-up signal is issued, the wake-up control circuit also notifies the sleep control circuit by sending the wake-up trigger signal. A portion of the wake-up control circuit provides the wake-up trigger signal, and includes flip-flop 144 and exclusive OR gate 146. The input terminal (D) of the flip-flop 144 is connected to the output terminal (Q) of the flip-flop 138, and receives the wake-up signal therefrom. The clock input terminal (C) of the flip-flop 144 is connected to the slow clock from the oscillator 36, and the reset terminal (R) is connected to the sleep signal from the sleep control circuit. The exclusive OR gate 146 has a first input terminal connected to the input terminal (D) of flip-flop 144 and a second input terminal connected to the output terminal (Q) of the flip-flop 144. In an initial condition of the wake-up control circuit, both the output terminal (Q) of the flip-flop 144 and the output terminal of the flip-flop 138 are logic low, so the output of the exclusive OR gate 146 is also at logic low. The first time that the wake-up signal is generated by flip-flop 138, the output of the exclusive OR gate 146 goes to logic high to provide the wake-up trigger signal. Upon the receipt of the next clock pulse from the slow clock, the flip-flop 144 latches the logic high at the output terminal (Q), causing the exclusive OR gate 146 to return to logic low. The exclusive OR gate 146 will thereby remain at logic low until a wake-up signal is again issued following a period of successive clock pulses in which the wake-up signal is not present.

Figure 7:
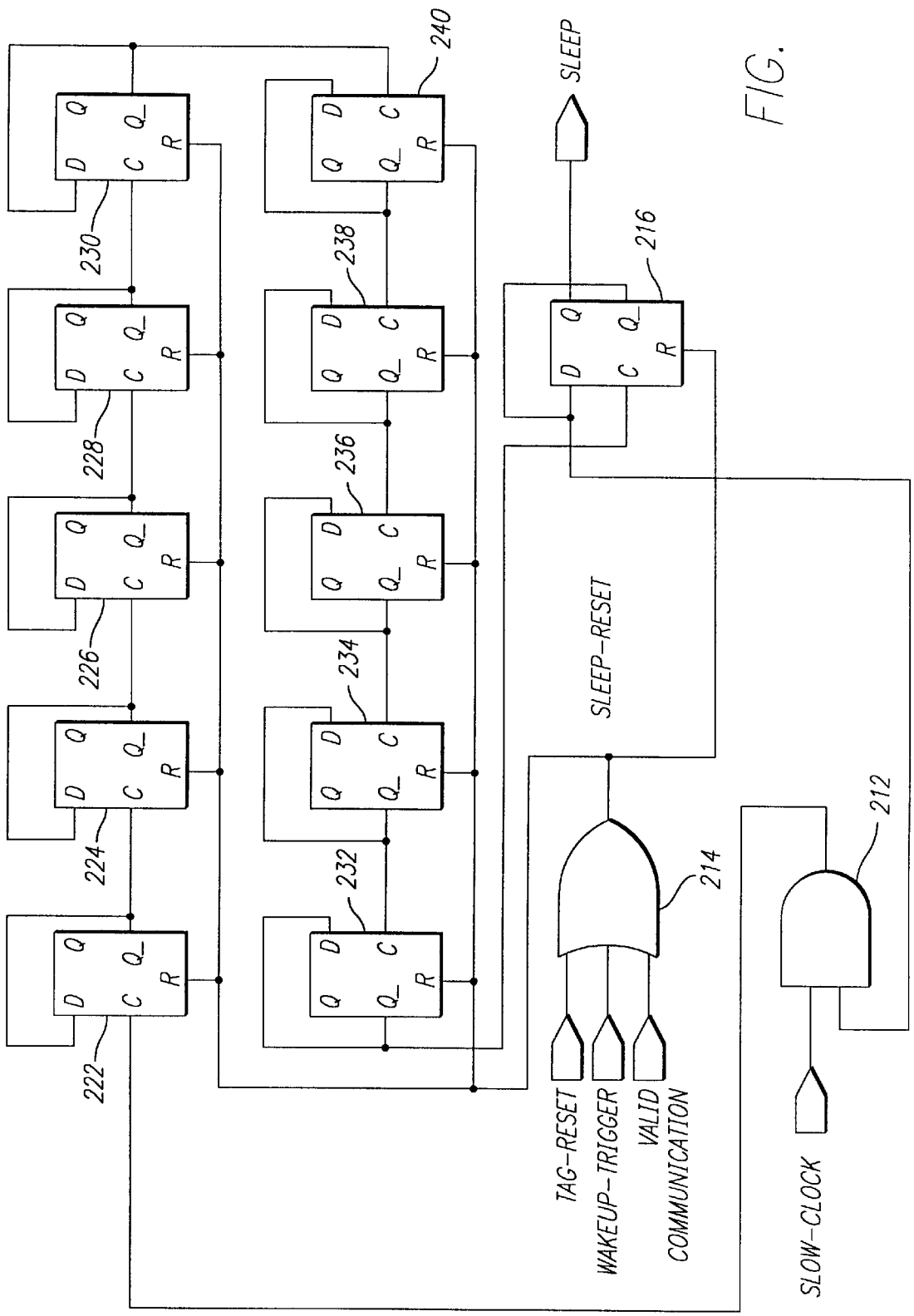
FIG. 7 is a schematic drawing of an exemplary sleep control circuit of the third embodiment of a wake-up circuit of FIG. 5.

FIG. 7 illustrates a schematic drawing of an exemplary sleep control circuit 64 for use in the wake-up circuit of FIG. 5. A first portion of the sleep control circuit 64 determines whether to begin a count of slow clock pulses from the oscillator 36 (see FIG. 5), and includes an OR gate 214, a flip-flop 216, and an AND gate 212. The OR gate 214 receives three inputs, including a tag-reset signal, a wake-up trigger signal, and a valid data signal, which serve to reset the count performed by the sleep control circuit 64. The tag-reset signal is provided by the main tag circuitry 48, and may be issued for various reasons, such as in response to a specific command from the interrogator. The valid communication signal is also provided by the main tag circuitry 48 upon verification that decoded data is valid. The wake-up trigger signal is a pulse provided by the wake-up control circuit (described above). Any one of these signals pass through the OR gate 214 as the sleep reset signal.

The output terminal (Q) of the flip-flop 216 provides the sleep signal to the wake-up control circuit (described above). The input terminal (D) is connected to the inverting output terminal (Q_), so that the initial condition of the flip-flop 216 has the input terminal (D) at logic high. The flip-flop 216 is triggered to change state and provide a logic high at the output terminal (Q) (i.e., the sleep signal) when the sleep control circuit reaches the predetermined count value. The inverting output terminal (Q_) is also connected to an input of the AND gate 212, and another input of the AND gate receives the slow clock. Accordingly, each clock pulse of the slow clock passes through the AND gate 212 until the sleep signal is provided.

The sleep control circuit further includes a counter comprised of ten flip-flops 222, 224, 226, 228, 230, 232, 234, 236, 238 and 240. The reset terminal of each of the ten flip-flops is connected to the sleep reset signal from the OR gate 214. The input terminal (D) and inverting output terminal (Q_) of each flip-flop are connected together, and the inverting output terminal (Q_) of each flip-flop is connected to the clock input (C) of the successive flip-flop, in the same manner as the counter of the wake-up control circuit (described above). The inverting output terminal (Q_) of the last flip-flop 240 is connected to the clock input (C) of the flip-flop 216. The clock input (C) of the first flip-flop 222 is connected to the output of the AND gate 212, and receives the clock pulses of the slow clock therethrough. Following a sleep reset signal, the first clock pulse of the slow clock causes the first flip-flop 222 to change state, and the inverting output (Q_) goes from logic high to logic low. The next clock pulse of the slow clock causes the first flip-flop 222 to again change state, and the inverting output (Q_) goes from logic low to logic high, causing the second flip-flop 224 to change state. The remaining flip-flops 226, 228, 230, 232, 234, 236, 238, 240 operate in a like manner until every one of the flip-flops have changed state, corresponding to a count of 1,024 (or $2^{10}$). When this count is reached, the output terminal (Q) of the flip-flop 216 goes to logic high and provides the sleep signal. As noted above, a different count value can be advantageously utilized to shorten or lengthen the sleep delay time, and the logic circuitry modified accordingly.

Figure 8:
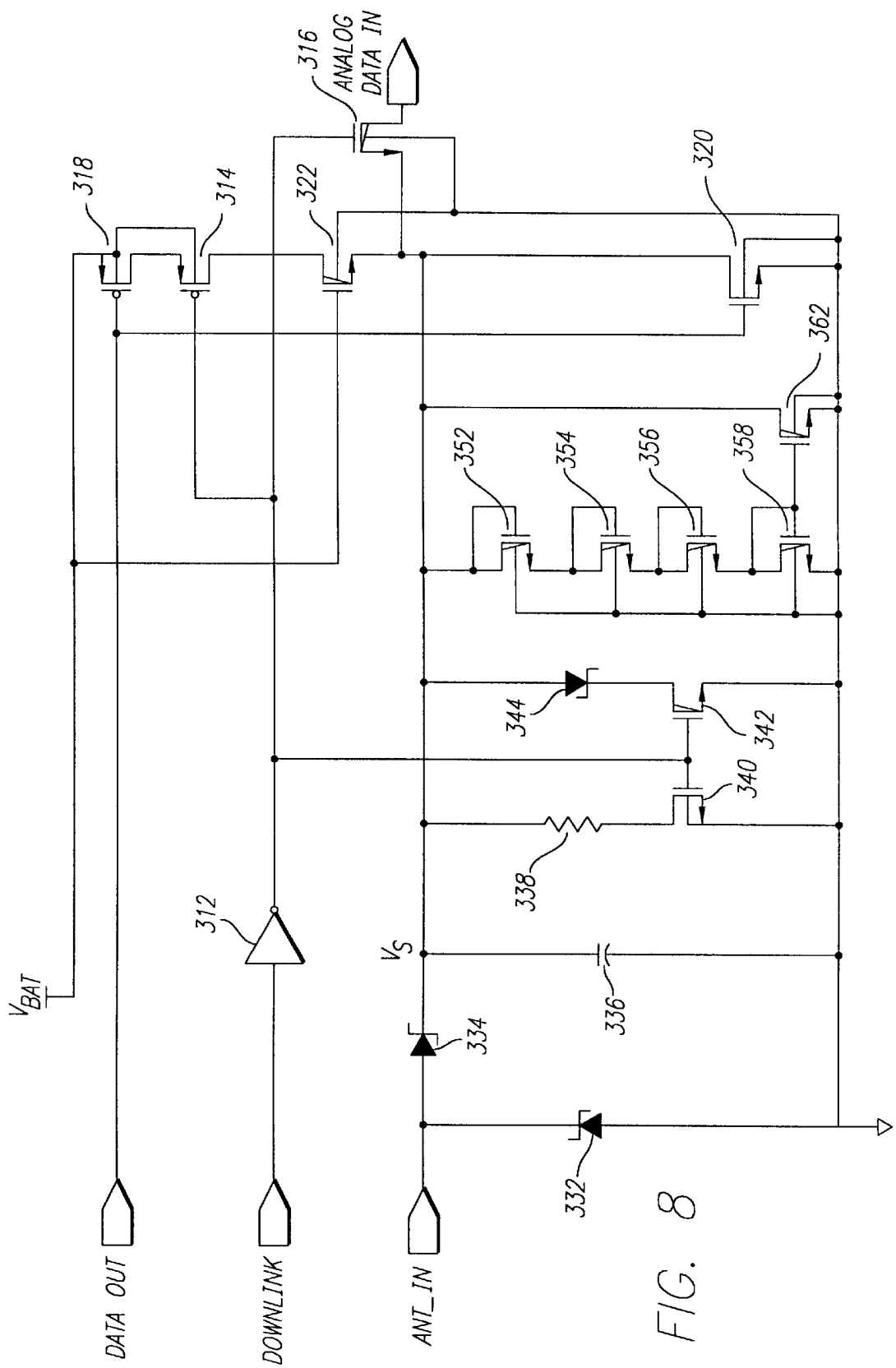
FIG. 8 is a schematic drawing of an exemplary RF receive/transmit block for use in the wake-up circuit of FIG. 5.

Referring now to FIG. 8, a schematic drawing is shown of an exemplary RF receive/transmit circuit for use in the wake-up circuit of the present invention. The RF receive/transmit circuit is an embodiment of the RF detect circuit 32 described above with respect to FIGS. 2, 3 and 5, and provides the RF front end for the RF transponder. More specifically, the RF receive/transmit circuit detects the RF interrogating signal in receive operations as well as modulating the impedance match with the antenna to reflect transmitted data into the interrogating field in a backscattered modulation technique. Significantly, the RF receive/transmit circuit only draws current from the battery when it is transmitting, and does not draw any current during receive operations.

More particularly, an RF signal at the antenna is coupled to the ANT IN terminal of the RF receive/transmit circuit. The RF signal passes through a voltage doubler circuit provided by Schottky diodes 332, 334. A first Schottky diode 332 is connected between the ANT IN terminal and ground, and a second Schottky diode 334 is connected in series to the conduction path between the ANT IN terminal and the ANALOG DATA IN terminal that is connected to the baseband amplifier 54 (see FIG. 5) (through n-channel MOSFET 316, described below). A received RF data signal modulated using on-off keying is rectified by the two Schottky diodes to effectively double its DC amplitude. For example, a 50 mv peak-to-peak RF input signal centered over ground becomes a rectified 50 mv DC signal above ground. The voltage doubler circuit draws no current from the battery. A capacitor 336 and a resistor 338 are coupled in parallel together between the anode of the Schottky diode 334 and ground, with the received analog signal voltage ($V_s$) being defined across the capacitor. The capacitor 336 provides a shunt path to ground for RF energy of the rectified input data signal while also blocking the DC signal from shorting to ground. The resistor 338 dissipates stored charge in the capacitor 336. When the interrogator transmits a logic high signal (i.e., RF energy keyed on), the capacitor 336 becomes charged up, thereby providing a rising edge of the data signal. Conversely, when the interrogator transmits a logic low signal (i.e., RF energy keyed off), the stored charge in the capacitor 336 discharges through the resistor 338; thereby providing a falling edge of the data signal. Thus, the charging time constant of the capacitor 336 determines the rise time of the rising edge of the data signal, and the RC time constant of the resistor 338 and capacitor 336 determine the fall time of the falling edge of the data. A third Schottky diode 344 provides protection for the baseband amplifier 54 (see FIG. 5) by limiting the amplitude of the data signal to a predetermined level.

In transmit operations, an output data signal from the main tag circuitry 48 is provided to the DATA OUT terminal. The p-channel MOSFET 318 and the n-channel MOSFET 320 effect modulation of the transmitted data, and the output data signal is connected to the gate terminal of these devices. As noted above, the RF transponder transmits data signals by modulating the input impedance of the RF receive/transmit circuit and thereby varying the degree of impedance match between the antenna and the RF receive/transmit circuit. When the output data signal to be transmitted is a logic low, the p-channel MOSFET 318 conducts and the n-channel MOSFET 320 is non-conductive, thereby negatively shifting the bias point of the Schottky diode 334. Conversely, when the output data signal to be transmitted is a logic high, the p-channel MOSFET 318 is non-conductive and the n-channel MOSFET 320 conducts, thereby positively shifting the bias point of the Schottky diode 334. The input impedance of the RF receive/transmit circuit varies in correspondence with the shifts in the bias point of the Schottky diode 334. As a result, the antenna reflects the interrogating signal in correspondence with the modulating input impedance of the RF receive/transmit circuit.

The RF receive/transmit circuit further includes five additional n-channel MOSFETs 352, 354, 356, 358, 362. Four of the n-channel MOSFETs 352, 354, 356, 358 are diode-coupled together in series across the capacitor 336, and the fifth n-channel MOSFET 362 is connected across the capacitor 336 with the gate terminal connected to the gate of the fourth diode-coupled MOSFET 358. This portion of the circuit provides protection to the capacitor 336 during transmit operations. The analog signal voltage ($V_s$) across the capacitor 336 can become large enough to damage the capacitor during a transmit operation in which p-channel MOSFET 318 is conducting and n-channel MOSFET 320 is non-conductive in the presence of a strong interrogating field, such as when the RF transponder is disposed closely proximate the interrogator. In that condition, the MOSFETs 352, 354, 356, 358 successively drop the analog signal voltage until the voltage at the gate of the MOSFET 362 reaches a threshold defined by the diode-coupled stack of MOSFETS. This causes MOSFET 362 to conduct and pull the analog signal voltage ($V_s$) toward ground. Similarly, a high-voltage n-channel MOSFET 322 protects the battery in the strong interrogating field condition with the p-channel MOSFET 318 conducting and n-channel MOSFET 320 non-conductive. If the analog signal voltage ($V_s$) is too high, the MOSFET 322 stops conducting, preventing current from flowing to the battery through the MOSFET 318. As known in the art, some batteries may become damaged when presented with an input charging current.

A downlink signal is provided to the RF receive/transmit circuit by the main tag circuitry 48 (see FIG. 5) to switch the RF receive/transmit circuit between downlink operations (i.e., transmit operations from the RF transponder to the interrogator) and uplink operations (i.e., receive operations from the interrogator to the RF transponder). Switching is provided by an inverter 312, a p-channel MOSFET 314, and n-channel MOSFETs 316, 340 and 342. When the downlink signal is at logic high (i.e., for downlink operations), MOSFET 314 is turned on which connects the p-channel MOSFET 318 in series with the n-channel MOSFET 320 to enable the transmit modulator. Also, MOSFET 316 is turned off which prevents the analog signal voltage ($V_s$) from passing to the baseband amplifier 54 during transmit operations. In addition, the MOSFETs 340, 342 are both turned off when the downlink signal is at logic high, which uncouples the resistor 338 and Schottky diode 344 from ground. This prevents the capacitor 336 from discharging, and the capacitor remains charged during transmit operations. Conversely, when the downlink signal is at logic low (i.e., for uplink operations), MOSFET 314 is turned off to disable the transmit modulator, MOSFET 316 is turned on to permit the analog signal voltage ($V_s$) to pass to the baseband amplifier 54, and MOSFETs 340, 342 are both turned on to permit receive operations.

Figure 9:
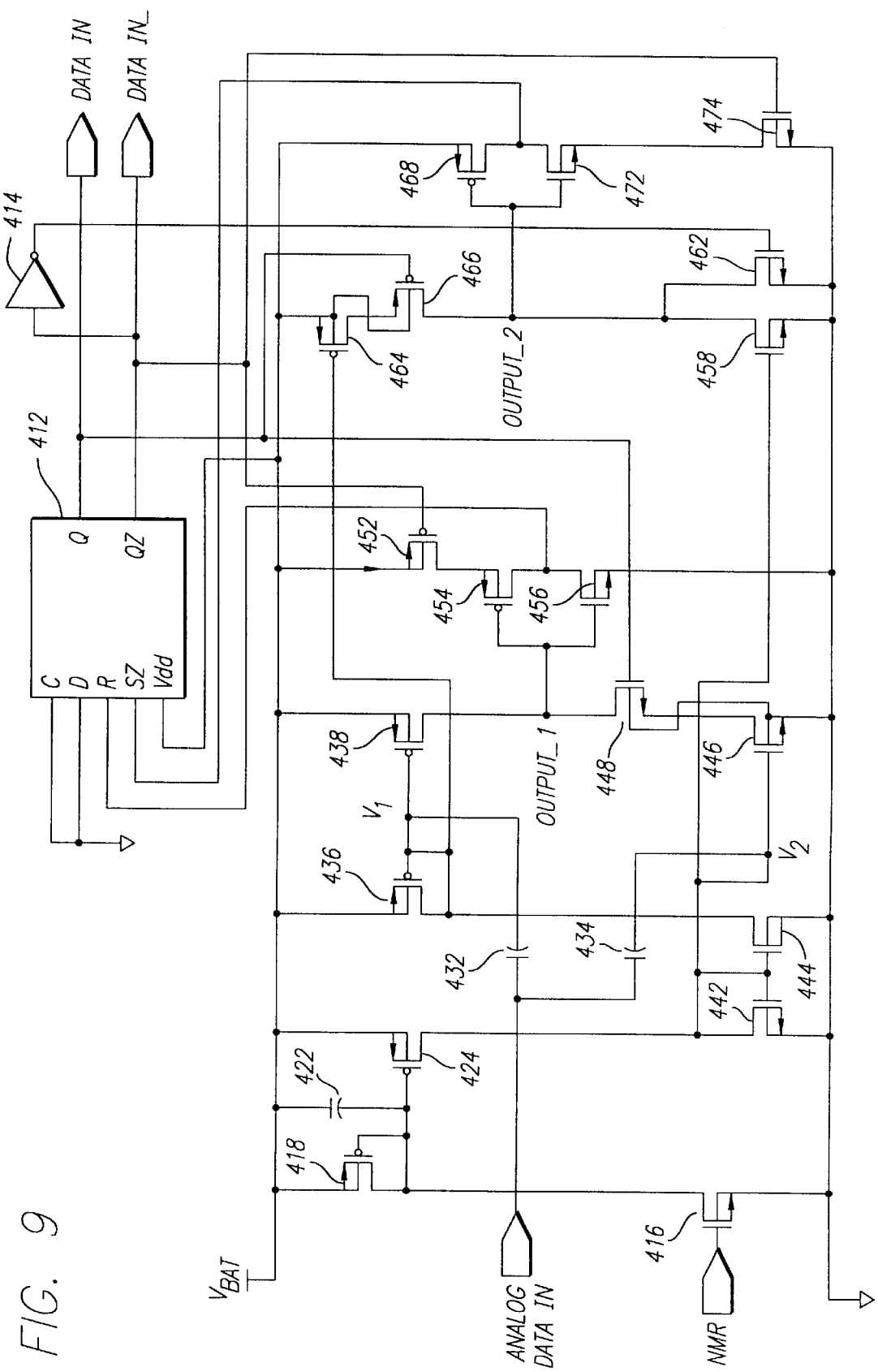
FIG. 9 is a schematic drawing of an exemplary baseband amplifier for use in the wake-up circuit of FIG. 5.

Referring now to FIG. 9, a schematic drawing is shown of an exemplary baseband amplifier for use in the wake-up circuit of the present invention. The baseband amplifier is an embodiment of the baseband amplifier 54 described above with respect to FIG. 5, and provides a stream of digital data based on the analog data signal generated by the RF detect circuit 32. The baseband amplifier includes two separate signal comparator portions, including a first comparator for detecting the rising edge of the analog data signal and a second comparator for detecting the falling edge of the analog data signal. Battery power is saved by disabling the falling edge comparator when a rising edge is expected, and disabling the rising edge comparator when a falling edge is expected. Moreover, the exemplary baseband amplifier circuit utilizes MOSFET devices that only draw current (excluding leakage current) from the battery when they are changing state.

The analog data signal from the RF detect circuit 32 (see FIG. 5) is received at the ANALOG DATA IN terminal of the baseband amplifier, and is capacitively coupled to the signal comparators which determine whether the analog data signal is "on" (i.e., corresponding to logic high) or "off" (i.e., corresponding to logic low). A first capacitor 432 is connected to the gate terminals of p-channel MOSFETs 436, 438, 464 and a second capacitor 434 is connected to the gate terminals of n-channel MOSFETS 442, 444, 446, 458. A first sensing voltage ($V_1$) is defined at the node connected to the gate terminals of p-channel MOSFETs 436, 438, 464, and a second sensing voltage ($V_2$) is defined at the node connected to the gate terminals of n-channel MOSFETs 442, 444, 446. The source terminals of the p-channel MOSFETs 436, 438, 464 are connected to the battery voltage ($V_{BAT}$). The source terminals of the n-channel MOSFETs 442, 444, 446 are connected to ground. The drain terminal of the p-channel MOSFET 436 is connected to the drain terminal of the n-channel MOSFET 444, and the drain terminal of the p-channel MOSFET 438 is connected to the drain terminal of the n-channel MOSFET 446 through another n-channel MOSFET 448. A node connected to the drain terminal of the p-channel MOSFET 438 is designated as OUTPUT_1. The drain terminal of the p-channel MOSFET 464 is connected to the drain terminal of the n-channel MOSFET 458 through another p-channel MOSFET 466. A node connected to the drain terminal of the p-channel MOSFET 466 is designated as OUTPUT_2.

As described above, the baseband amplifier further includes two signal comparator portions. A first comparator detects rising edges of the analog data signal, and comprises the aforementioned p-channel MOSFET 438 and n-channel MOSFETs 448, 446, along with p-channel MOSFETs 452, 454 and n-channel MOSFET 456. The gate terminals of the p-channel MOSFET 454 and the n-channel MOSFET 456 are commonly connected to the OUTPUT_1 terminal. Devices p-channel MOSFET 454 and n-channel MOSFET 472 implement an inverter circuit. A second comparator detects falling edges of the analog data signal, and comprises the aforementioned p-channel MOSFETs 464, 466 and n-channel MOSFET 458, along with p-channel MOSFETs 466, 468 and n-channel MOSFETs 472, 474. The gate terminals of the p-channel MOSFET 468 and the n-channel MOSFET 472 are commonly connected to the OUTPUT_2 terminal. Devices p-channel MOSFET 468 and n-channel MOSFET 472 together implement an inverter circuit.

The baseband amplifier further includes a flip-flop 412 and an inverter 414. The clock (C) and input terminal (D) of the flip-flop 412 are connected to ground. The reset terminal (R) is connected to the junction between the drain terminal of the p-channel MOSFET 454 and drain terminal of the n-channel MOSFET 456 of the first comparator, i.e., the inverter output. The inverted set terminal (SZ) is connected to the junction between the drain terminal of the p-channel MOSFET 468 and the drain terminal of the n-channel MOSFET 472 of the second comparator, i.e., the inverter output. The output terminal (Q) provides the digital input data to the DIGITAL_IN_DATA terminal that is connected to the main tag circuitry 48 (see FIG. 5), and is further connected to the gate terminal of the n-channel MOSFET 448 of the first comparator and the gate terminal of the p-channel MOSFET 466 of the second comparator. The inverting output terminal (Q_) is connected to the gate terminal of the p-channel MOSFET 452 of the first comparator and the gate terminal of the n-channel MOSFET 474 of the second comparator. The inverter 414 is connected between the inverting output terminal (Q_) of the flip-flop 412 and the gate terminal of the n-channel MOSFET 462.

The circuit is biased by n-channel MOSFET 416, p-channel MOSFETs 418, 424, and capacitor 422. An n-channel bias voltage (NMR) is applied to the gate of the n-channel MOSFET 416, causing it to conduct and turn on the p-channel MOSFETs 418, 424. In turn, n-channel MOSFETs 442, 444 and p-channel MOSFET 436 are conducting, so that current flowing through p-channel MOSFET 436 mirrors the current flowing through n-channel MOSFET 442. Moreover, at the nominal bias point, the current sinking capability of the n-channel MOSFET 446 is designed to be slightly weaker than the current sourcing capability of the p-channel MOSFET 438. Under steady-state conditions, this causes p-channel MOSFET 438 to be slightly more conductive than n-channel MOSFET 446, such that the voltage defined at OUTPUT_1 is pulled to $V_{BAT}$ in the absence of any change in the input at $V_1$ and/or $V_2$. Similarly, at the nominal bias point, the current sinking capability of the n-channel MOSFET 458 is designed to be slightly stronger than the current sourcing capability of the p-channel MOSFET 464. Under steady-state conditions, this causes n-channel MOSFET 458 to be slightly more conductive than p-channel MOSFET 464, such that the voltage defined at OUTPUT_2 is pulled to ground in the absence of any change in the input at $V_1$ and/or $V_2$.

Starting from a condition in which the analog input signal corresponds to logic low, the output terminal (Q) of the flip-flop 412 is at logic high and the inverting output terminal (Q_) is at logic low. The first comparator is enabled by the logic high from the output terminal (Q) applied to the gate of n-channel MOSFET 448 and the logic low from the inverting output terminal (Q_) applied to the gate of the p-channel MOSFET 452. Similarly, the second comparator is disabled, as n-channel MOSFET 474 and p-channel MOSFET 466 of the second comparator are non-conductive. When the analog data signal rises, the capacitors 432, 434 couple that signal to the gate terminals of p-channel MOSFETs 436, 438 and n-channel MOSFETs 442, 444, 446, respectively. The first and second sensing voltages ($V_1$, $V_2$) rise sharply, then decay downward at a rate determined by the impedance at the respective nodes. This causes the voltage at OUTPUT_1 to be pulled downward toward ground, causing p-channel MOSFET 454 to conduct and n-channel MOSFET 456 to be non-conductive. As a result, the voltage at the reset terminal (R) of the flip-flop 412 at the junction, between the drain terminal of the p-channel MOSFET 454 and the drain terminal of the n-channel MOSFET 456 rises, causing the flip-flop to change state and provide logic low at the output terminal (Q) and logic high at the inverting output terminal (Q_).

From this condition, the first comparator is disabled, as n-channel MOSFET 448 and p-channel MOSFET 452 are non-conducting, and the second comparator is enabled, as n-channel MOSFET 474 and p-channel MOSFET 466 are conducting. When the analog data signal falls, the capacitors 432, 434 couple that signal to the gate terminals of p-channel MOSFETs 436, 438 and n-channel MOSFETs 442, 444, 446, respectively. The first and second sensing voltages ($V_1$, $V_2$) fall sharply, then decay upward at a rate determined by the impedance at the respective nodes. This causes the voltage at OUTPUT_2 to be pulled upward toward the battery voltage ($V_{BAT}$), causing p-channel MOSFET 468 to be non-conductive and n-channel MOSFET 472 to conduct. As a result, the voltage at the inverting set terminal (SZ) of the flip-flop 412 at the junction between the drain terminal of the p-channel MOSFET 468 and the drain terminal of the n-channel MOSFET 472 falls, causing the flip-flop to change state and provide logic high at the output terminal (Q) and logic low at the inverting output terminal (Q_).

In the foregoing description of exemplary wake up circuits, it should be appreciated that the time durations, frequencies, circuit elements, and other aspects are entirely exemplary, and should not be construed as limiting of the scope of the invention. It is further anticipated, that the wake up and sleep modes of the RF transponder be adaptive, whereby the time durations and counts performed by are changed in a real-time manner to reflect changes in the operational environment. Moreover, the RF transponder may be further adapted to enter long term dormancy periods in which the RF transponder is not waked in the normal manner, and may only be waked after receiving a certain command or upon the occurrence of a certain event. The RF transponder may be responsive to a specific command from the interrogator to remain in the sleep mode notwithstanding the presence of interrogating signals, such as when passive and active RF transponders are present together in a common location. Lastly, the wake up circuit may be made responsive to signals in plural frequency ranges to be waked by interrogators operating at the different ranges.

Having thus described a preferred embodiment of active RF transponder with a selective wake-up circuit, it should be apparent to those skilled in the art that certain advantages of the within described system have been achieved. It should also be appreciated that various modifications, adaptations, and alternative embodiments thereof may be made within the scope and spirit of the present invention. The invention is further defined by the following claims.

What is claimed is:

1. An active RF transponder including electronic circuitry, comprising:
    a battery;
    an antenna adapted to receive RF signals from an interrogator;
    an oscillator adapted to provide a clock signal having a duty cycle; and
    a wake-up circuit coupled to the antenna and the oscillator and adapted to periodically sample said RF signals for presence of an interrogation signal, said duty cycle defining the intervals during which the antenna is sampled for presence of the interrogation signal.

2. The active RF transponder of claim 1, wherein the wake-up circuit further comprises a switch adapted to selectively couple the battery to the electronic circuitry and provide electrical power thereto upon detection of the interrogation signal.

3. The active RF transponder of claim 2, wherein the wake-up circuit draws current from the battery in correspondence with the duty cycle.

4. The active RF transponder of claim 2, wherein the wake-up circuit further comprises a comparator coupled to the antenna, the comparator comparing amplitude of the RF signals to a threshold in accordance with the clock signal and signaling the switch to couple the battery to the electronic circuitry upon the detected RF signals crossing the threshold.

5. The active RF transponder of claim 2, wherein after the switch has coupled the battery to the electronic circuitry, the switch becomes uncoupled upon detection that amplitude of the RF signals has dropped below a threshold for a predetermined period of time.

6. The active RF transponder of claim 2, wherein after the switch has coupled the battery to the electronic circuitry, the switch becomes uncoupled upon detection that receipt of a message encoded in the RF signals has completed.

7. The active RF transponder of claim 2, wherein the wake-up circuit is further adapted to detect a code sequence modulated in the RF signals, the battery being coupled to the electronic circuitry by operation of the switch if the detected code sequence correlates with a predetermined code sequence.

8. The active RF transponder of claim 7, wherein the wake-up circuit oversamples the RF signals to detect the code sequence modulated therein.

9. The active RF transponder of claim 2, wherein the antenna is sampled for approximately 20 ns every 100 $\mu$s in accordance with the duty cycle.

10. An active RF transponder including electronic circuitry, comprising:
    a battery;
    an antenna adapted to an receive RF signal from an interrogator;
    an oscillator adapted to produce a clock signal having a duty cycle;
    an analog-to-digital circuit adapted to recover digital data signals from said received RF signal; and
    a wake-up circuit coupled to the analog-to-digital circuit and the oscillator and adapted to determine the frequency range of said digital data signals at intervals defined by said -duty cycle, said wake-up circuit further including a switch adapted to selectively couple the battery to the electronic circuitry and provide electrical power thereto upon detection that the digital data signals are within a predetermined frequency range.

11. The active RF transponder of claim 10, wherein the clock signal defines counting periods during which successive transitions of the digital data signals are counted, said digital data signals being considered within said predetermined frequency when a predetermined number of said successive transitions of the digital data signals are present in plural ones of said counting periods.

12. The active RF transponder of claim 11, wherein said plural ones of said counting periods further comprises at least two counting periods.

13. The active RF transponder of claim 11, wherein said predetermined number of said successive transitions of the digital data signals further comprises at least three.

14. The active RF transponder of claim 11, wherein said counting period is approximately 100 $\mu$s.

15. The active RF transponder of claim 11, wherein said analog-to-digital circuit further comprises a baseband amplifier.

16. The active RF transponder of claim 10, wherein said switch uncouples the battery from the electronic circuitry after a predetermined period of time elapses with the digital data signals being outside said predetermined frequency range.

17. The active RF transponder of claim 16, wherein the clock signal defines counting periods during which successive transitions of the digital data signals are counted, said digital data signals being considered outside said predetermined frequency when less than a predetermined number of said successive transitions of the digital data signals are present in plural ones of said counting periods.

18. The active RF transponder of claim 17, wherein said plural ones of said counting periods further comprises approximately 1,000 counting periods.

19. The active RF transponder of claim 10, wherein said switch uncouples the battery from the electronic circuitry if the digital data signals do not comprise valid data.

20. The active RF transponder of claim 10, further comprising an RF receive/transmit circuit and a rectifier coupled to said antenna, said rectifier providing an analog data signal.

21. The active RF transponder of claim 20, wherein said rectifier further comprises at least one Schottky diode.

22. The active RF transponder of claim 21, wherein said rectifier further comprises a capacitor coupled in parallel with said at least one Schottky diode, said capacitor becoming charged upon receipt of a logic high signal.

23. The active RF transponder of claim 22, wherein said rectifier further comprises a resistor coupled in parallel with said at least one Schottky diode, said capacitor discharging through said resistor upon receipt of a logic low signal.

24. The active RF transponder of claim 20, wherein said RF receive/transmit circuit is adapted to transmit data by modulating impedance of said rectifier.

25. The active RF transponder of claim 20, wherein said RF receive/transmit circuit further comprises a battery protection portion adapted to prevent current from flowing to said battery.

26. The active RF transponder of claim 15, wherein said baseband amplifier further comprises a first portion adapted to detect a rising edge of said received RF signals and a second portion adapted to detect a falling edge of said received RF signals.

27. The active RF transponder of claim 26, wherein said first portion and said second portion operate in an alternating manner.

28. The active RF transponder of claim 15, wherein said RF signals are coupled to said baseband amplifier through at least one capacitor.

* * * * *

UNITED STATES PATENT AND TRADEMARK OFFICE
CERTIFICATE OF CORRECTION

PATENT NO. : 6,593,845 B1
DATED : July 15, 2003
INVENTOR(S) : Daniel J. Friedman, Thomas A. Cofino and Trieu C. Chieu It is certified that error appears in the above-identified patent and that said Letters Patent is hereby corrected as shown below:

<u>Title page,</u>
Item [73], Assignee, the correct spelling of the Assignee's name is
-- Intermec IP Corp. --

Signed and Sealed this

Seventeenth Day of February, 2004

JON W. DUDAS
*Acting Director of the United States Patent and Trademark Office*